United States Patent [19]
Tokas et al.

[11] Patent Number: 5,087,510
[45] Date of Patent: Feb. 11, 1992

[54] ELECTROLESSLY DEPOSITED METAL HOLOGRAMS

[75] Inventors: Edward F. Tokas, Creve Coeur; George D. Vaughn, Ballwin; David L. Taylor, St. Louis; Albert W. Morgan, Chesterfield, all of Mo.

[73] Assignee: Monsanto Company, St. Louis, Mo.

[21] Appl. No.: 497,960

[22] Filed: Mar. 22, 1990

[51] Int. Cl.$^5$ ................................. B32B 9/00
[52] U.S. Cl. .................... 428/209; 428/195; 428/457; 428/913; 264/106; 283/83; 359/1
[58] Field of Search ............ 428/195, 209, 457, 913; 350/3.6, 3.7, 162.23; 106/1.27; 430/66, 323; 264/106; 283/83

[56] References Cited

U.S. PATENT DOCUMENTS

| | | | |
|---|---|---|---|
| 3,944,420 | 3/1976 | Gale et al. | 430/323 |
| 3,962,495 | 6/1976 | Feldstein | 106/1.27 |
| 4,018,603 | 4/1977 | Sheridan et al. | 430/66 |
| 4,315,665 | 2/1982 | Haines | 350/3.7 |
| 4,576,439 | 3/1986 | Gale et al. | 350/162.23 |
| 4,840,444 | 6/1989 | Hewitt | 350/3.6 |
| 4,910,072 | 3/1990 | Morgan et al. | 428/212 |

FOREIGN PATENT DOCUMENTS 0338378 11/1989 European Pat. Off. .

Primary Examiner—Patrick J. Ryan
Attorney, Agent, or Firm—Thomas E. Kelley; Richard H. Shear

[57] ABSTRACT

Electrolessly deposited metal holograms comprising a polymeric substrate having a holographic relief-patterned surface and a metal reflective layer electrolessly deposited to conform to and reproduce the holographic relief patterned. Light incident to the metal surface is reflected to provide an holographic reproduction of an holographic image inherent in said relief-patterned polymeric substrate.

9 Claims, 1 Drawing Sheet

ELECTROLESSLY DEPOSITED METAL HOLOGRAMS

Disclosed herein are holograms comprising a relief-patterned metal surface electrolessly deposited to conform to a relief-patterned polymeric substrate.

BACKGROUND OF THE INVENTION

Holograms and other types of diffraction gratings comprising reflective metal surface on a relief-patterned substrate are commonly used for decorative packaging, artistic images and security devices, e.g. on credit cards, currency and other official documents. Such holograms can be prepared by a variety of methods such as embossing deformable metal foil laminates with a holographic image stamp. Due to the resilience of laminate components, such embossed holograms tend to be of poor quality especially when subjected to elevated temperatures.

An alternative method is disclosed by D'Amato et al. in European Patent Publication 0 338 378 where a holographic polymeric substrate is formed by casting and curing a polymer precursor in contact with a holographic relief-patterned mold to form a polymeric substrate with a holographic relief-patterned surface; a metal reflective surface is then deposited on the relief-patterned surface, e.g. by vapor deposition techniques. The resulting relief-patterned metal surface serves to reflect incident light into a reconstructed image of the hologram. A disadvantage of such metal deposition is the requirement to conduct such metal deposition in a vacuum environment and to mask areas where metal deposition is not desired especially if the hologram is mounted on a document.

An object of this invention is to provide such reflective metal holograms which can be prepared by metal deposition techniques that do not require vacuum environments or masking. One method for depositing metal onto polymeric substrates is electroless deposition. However, electroless deposition of metal has some disadvantages which do not commend it to such hologram preparation. For instance, many techniques for electroless deposition of metal onto plastics require etching to achieve a effective level of adhesion; such etching, e.g. with strong acids or solvents, can destroy the holographic relief pattern of the polymeric substrate surface. Moreover, electroless deposition techniques often utilize catalytic materials of a size on the order of magnitude of the holographic relief pattern; deposition of dispersed particulate catalytic materials can distort the reproduction of the holographic relief pattern in the metal coating.

SUMMARY OF THE INVENTION

Despite the disadvantages inherent in many electroless deposition techniques, this invention provides an hologram comprising a relief-patterned metal surface electrolessly-deposited to conform to a relief-patterned polymeric substrate, whereby light incident to the surface of said metal opposite to said polymeric substrate is reflected to provide an holographic reproduction of an holographic image inherent in said relief-patterned polymeric substrate. Such metals are provided in thin, conforming layers that reproduce the holographic relief-patterned surface of the polymeric substrate by electroless deposition techniques.

This invention also provides methods of preparing electrolessly deposited metal holograms, e.g. preparing a polymeric substrate having a holographic relief-patterned surface and electrolessly depositing a holographic metal reflective layer on said relief-patterned surface. In a preferred embodiment the electrolessly deposited metal holograms of this invention can be prepared by: (a) forming a polymeric substrate having a holographic relief-patterned surface; and (b) electrolessly depositing thereon a metal layer conforming to and reproducing said holographic relief pattern. In a preferred method, the substrate is formed by casting and curing a crosslinked polymer against a holographic relief-patterned mold.

DETAILED DESCRIPTION OF PREFERRED EMBODIMENTS

Figure 1:
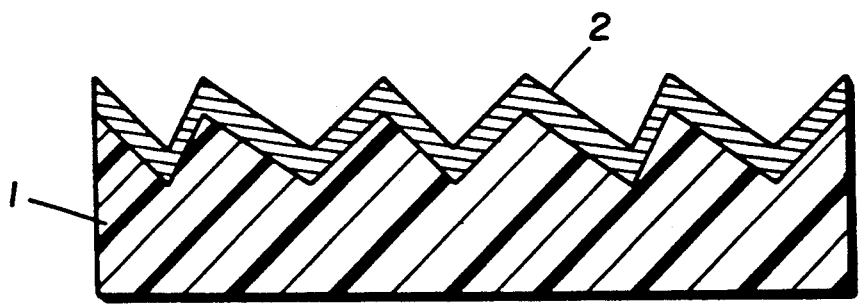
FIG. 1 is a schematic representation of an electrolessly deposited metal hologram according to this invention.

Referring to FIG. 1 there is illustrated a polymeric substrate 1 which can be prepared by molding a molten thermoplastic, e.g. a high glass temperature thermoplastic such as a polyimide or polyetherketone, in a mold having a holographic relief pattern on its surface. Preferably, such polymeric substrate can be prepared by casting and curing a thermoset, e.g. crosslinked plastic such as an acrylate, urethane or epoxy polymer, in a mold having a holographic relief pattern. Methods for preparing such substrates are known in the art and are disclosed by D'Amato et al. in European Patent Publication 0 338 378, the specification of which is incorporated herein by reference.

Conforming to the holographic relief pattern of the polymeric substrate is an electrolessly deposited metal layer 2 which provides a reflective surface from which incident light can be reflected into a reconstructed image of the hologram inherent in the holographic relief pattern. As indicated above many electroless deposition techniques are inherently incompatible for use in preparing holographic metal surfaces. It has been discovered that electroless deposition techniques such as those disclosed by Morgan et al. in U.S. Pat. No. 4,910,072 and by Vaughn in U.S. application Ser. No. 07/454,565, the specifications of both of which are incorporated herein by reference 1 are surprisingly advantageous and efficacious in the preparation of holographic metal surfaces. Briefly such electroless deposition comprises: (a) coating an holographic relief-patterned polymeric substrate 1 with a film-forming solution of a polymer, e.g. polyvinyl alcohol, and a Group 8 metal, e.g. a palladium salt; (b) drying said film-forming solution to form a polymeric film essentially conforming to and reproducing said holographic relief pattern; (c) heating said polymeric film to provide a catalytic surface thereon; (d) applying to said catalytic surface an electroless depositing metal solution, e.g. a commercial nickel electroless plating solution, for sufficient time to electrolessly deposit thereon a metal layer 2 which essentially conforms to and reproduces said holographic relief pattern. The drying and heating can be simultaneously effected.

The electrolessly deposited metal layer 2 should be sufficiently thick, e.g. at least about 50 Angstroms thick, to provide a mirror like surface and sufficiently thin, e.g. not more than about 3000 Angstroms thick so as to not obscure the underlying holographic image. A balance of good reproduction of the holographic image and durability of a mirror like finish is achieved when the metal layer is between about 100 and 1000 Angstroms thick. Most preferred metal layers are about 200 to 600 Angstroms thick. Useful metals for the electrolessly deposited layer include nickel, cobalt and copper which can be applied as a monometal layer or a laminate of metal layers. The metal layer can be optionally overcoated with a protective wear layer, e.g of a clear acrylate or urethane topcoat which does not interfere with the transmission of light to and from the metal layer.

An advantage of the electrolessly deposited holograms of this invention is the application of methods of preparation thereof to continuous processing of web material containing such holograms including web material comprising holograms of extended length as on artistic or decorative sheets and web material comprising holograms on selected areas of the web as on security documents. Such continuous processes are disclosed in European Patent Publication 0 338 378 referred to hereinabove. The electroless deposition methods can be effected by applying the film forming solution and electroless depositing metal solutions from solution saturated surfaces in register with a moving web so as to contact the holographic relief surface of the polymeric substrate and catalyzed relief surface, respectively.

While specific embodiments have been described herein, it should be apparent to those skilled in the art that various modifications thereof can be made without departing from the true spirit and scope of the invention. Accordingly, it is intended that the following claims cover all such modifications within the full inventive concept.

What is claimed is:

1. A hologram comprising a polymeric substrate having a hologram generating relief-patterned surface coated with catalytic, polymeric film comprising a Group 8 metal which conforms to and reproduces said hologram generating relief pattern and a layer of metal electrolessly deposited onto said catalytic film, wherein said metal layer conforms to said hologram generating relief-pattern whereby light incident to the surface of said metal opposite to said polymeric substrate is reflected to reproduce a holographic image inherent in said relief-patterned polymeric substrate.

2. A hologram according to claim 1 wherein said polymeric substrate comprises a crosslinked polymer.

3. A hologram according to claim 2 wherein said electrolessly deposited metal comprises nickel, copper, palladium, silver, platinum, gold or cobalt.

4. A hologram according to claim 1 wherein said electrolessly deposited metal layer is 50 to 3000 Angstroms thick.

5. In a hologram comprising a reflective metal surface on a relief-patterned polymeric substrate, the improvement wherein said reflective metal surface is electrolessly deposited onto a catalytic, polymeric coating conforming to and reproducing said relief-patterned polymeric substrate to provide holographic image producing surfaces on both the relief-patterned polymeric substrate side and opposite side of said metal surface, wherein light incident to both of said metal surfaces is reflected to reproduce a holographic image inherent in said relief patterned polymeric substrate.

6. A method of preparing electrolessly deposited metal holograms comprising:
   (a) forming a polymeric substrate having a holographic relief-patterned surface;
   (b) applying to said surface a catalytic, polymeric film comprising a Group 8 metal, wherein said film conforms to and reproduces said relief pattern;
   (c) electrolessly depositing onto said film a metal layer conforming to and reproducing said holographic relief pattern.

7. A method according to claim 6 wherein said substrate is formed by casting and curing a crosslinked polymer against a holographic relief-patterned mold.

8. A method according to claim 7 wherein said applying of a catalytic, polymeric film comprises (a) coating said holographic relief-patterned surface with a film-forming aqueous solution of a polymer and a Group 8 metal; (b) drying said film-forming solution to form a polymeric film essentially conforming to and reproducing said holographic relief pattern; and (c) heating said polymeric film to provide a catalytic surface thereon.

9. A method according to claim 8 wherein a plurality of said holograms is prepared on a moving web.

* * * * *